3,464,902
PROCESS FOR PREPARING MERCURIC OXIDE
Yasuji Amano, Hirakata-shi, Hiroshi Kumano, Daito-shi, and Atsushi Nishino, Neyagawa-shi, Japan, assignors to Matsushita Electric Industrial Co., Ltd., Osaka, Japan, a corporation of Japan
Filed July 1, 1966, Ser. No. 562,175
Claims priority, application Japan, July 9, 1965, 40/42,215, 40/42,216
Int. Cl. C01b *13/14;* C22d *1/04;* B01k *1/00*
U.S. Cl. 204—96                    4 Claims

ABSTRACT OF THE DISCLOSURE

A process for preparing mercuric oxide characterized by carrying out electro-oxidation in a system which comprises an insoluble metal cathode, a metal mercury anode, and an electrolytic solution containing at least one ionic component selected from the group consisting of carbnate ion and hydroxyl ion, if required, added with chloride ion.

Figure 1:
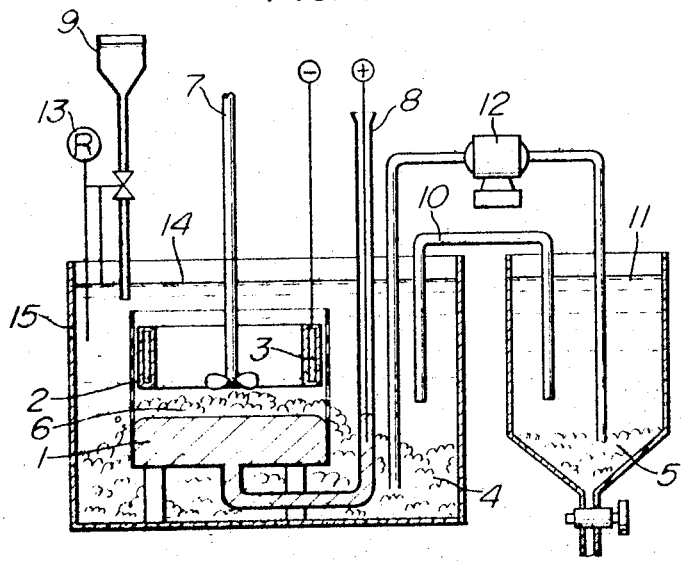

This invention relates to a process for preparing mercuric oxide, characterized in that electro-oxidation is made in a system which comprises a cathode consisting of insoluble metal, an anode consisting of metal mercury and an electrolytic solution containing the principal electrolyte consisting of at least one kind of ion component selected from the group consisting of carbonate ion and hydroxyl ion, if required, added with chloride ion.

The conventional processes for preparing mercuric oxide are divided into two processes, dry process and wet process.

The dry process is a process in which metal mercury reacts with concentrated nitric acid to yield mercuric nitrate, the obtained mercuric nitrate is crushed to appropriate pieces and is subjected to thermal decomposition at 300°–350° C., and thereby red mercuric oxide is obtained.

The wet process is a process in which metal mercury reacts with chlorine gas at a high temperature to yield corrosive sublimate $HgCl_2$, and the reaction of the obtained corrosive sublimate with sodium hydroxide results in yellow mercuric oxide.

In the above two processes, very harmful substances are treated at high temperatures and are very apt to injure human bodies in operation. Further, complicated equipments and steps according to batch system are required so that there occurs difficult problems on the corrosive strength of these equipments and the intermixing of impurities into the product due to the corrosion of the equipments. Therefore, from the viewpoint of cost and quality of the product, there have remained many unsolved points, for example, the improvement of purity and electrochemical properties of mercuric oxide.

Mercuric oxide obtained according to the wet process is chemically active and has wide convenient properties for cell material, but its tapping density is so bad that its mixed cake is unsuitable to working and handling, and that a crack may easily be caused during the molding. Further, its specific resistance is so high that the high drain discharge of its cell can hardly be made. Owing to the above reasons, mercuric oxide according to the wet processes has not so far been employed for mercury cells.

Mercuric oxide obtained according to the dry process can rather easily be employed for the molding of its mixed cake and also is superior to that of the wet process with respect to tapping density. In consequence of the manufacturing condition, however, it is impossible to prevent the intermixing of impurities such as $NO_2$ and $NO_3$. These impurities cause very ill effects on the preserving ability of mercury cell. In spite of the above electrochemical disadvantage for cell, the mercuric oxide according to the dry process has been employed up to now because of its easiness for handling and working in the manufacture of cell.

The present invention is to electrochemically prepare mercury oxide according to the process of electro-oxidation which is essentially different from either of the said conventional processes.

The process of electro-oxidation is to electro-oxidize metal mercury in a system which comprises an insoluble cathode, a metal mercury anode and an electrolytic solution containing the principal electrolyte consisting of at least one kind of ion component selected from the group consisting of carbonate ion and hydroxyl ion, if required, added with chloride ion.

In the process of electro-oxidation, the manufacturing steps are very simple and consequently there is small danger during the operations. Further, because of electrochemical anode oxidation, it is possible by selecting the appropriate condition of electrolysis to provide mercuric oxide which has many advantages as the cell material with regard to the purity, cost and quality of the product.

For example, as for the cost, the manufacturing steps are simple and continuous operation is possible, so the cost of manufacturing can be reduced.

As regards the quality, the steps are simple, the preparation is made without any corrosive reagent, and the intermixing of impurities can be prevented by carrying out the anode oxidation in an electrolytic solution similar to that of a cell. Besides, because of continuous manufacturing steps, the quality of product is stable.

As the cell material, the mercuric oxide according to this process can readily be mixed with black lead, its mixed cake can easily be molded under pressure without the occurrence of a crack so that it is excellent in handling and working, and further, due to small specific resistance and excellent tapping density, it is advantageous for improvement of cell ability and miniaturization of a cell.

The reaction mechanism is explained below for a case that potassium salt is used as the electrolyte.

(I) Cathode reaction $$KCl \rightarrow K^+ + Cl^- \qquad (1)$$

$$KOH \rightarrow K^+ + OH^- \qquad (2)$$

$$K_2CO_3 \rightarrow K^+ + KCO_3^- \rightarrow 2K^+ + CO_3^{2-} \qquad (3)$$

$$K^+ + e^- \rightarrow K \qquad (4)$$

$$2K + 2H_2O \rightarrow 2KOH + H_2\uparrow \qquad (5)$$

In the electrolyte such dissociations as (1), (2) and (3) occur, such cathode reactions as (4) and (5) progress, and hydrogen gas is generated from the cathode.

(II) Anode reaction

The reaction mechanism varies with the composition and concentration of the electrolyte.

(a) A case that KOH or $K_2CO_3$ is singly used:

$$2Hg + 2OH^- \rightarrow Hg_2O + H_2O + 2e^- \qquad (6)$$

$$Hg_2O + H_2O \rightarrow HgO + Hg + H_2O \qquad (7)$$

Mercuric oxide thus obtained is mainly of yellow color, which varies somewhat with the electrolytic condition. In this case, the reaction Formula 7 is the rate-determining step of over all reactions and, as compared with other cases, the cell voltage is relatively high and the current efficiency is rather worse but is superior to the dry and wet processes.

(b) A case that KCl is singly used:

$$2Hg + 2Cl^- \rightarrow Hg_2Cl_2 + 2e^- \qquad (8)$$

Calomel is formed and the reaction of Formula 9 does not progress so smoothly that mercuric oxide can not continuously be prepared.

(c) A case that a two constituent system consisting of KOH and $K_2CO_3$ is used:

The result of the reaction is almost the same as in (a).

(d) A case that a two constituent system consisting of $K_2CO_3$ and KCl is used:

$$2Hg + 2Cl^- \rightarrow Hg_2Cl_2 + 2e^- \qquad (8)$$

$$Hg_2Cl_2 + 2OH^- \rightarrow Hg_2OCl + H_2O + Cl^- + e^- \qquad (9)$$

$$Hg_2OCl + K^+ + e^- \rightarrow HgO + Hg + KCl \qquad (10)$$

The solution composition of the two constituent system is preferably in the range of, $$0.5 \text{ mol/l.} < CO_3^{--} < 4 \text{ mol/l.} \qquad (11)$$

$$0.09 \text{ mol/l.} < Cl^- < 7 \text{ mol/l.} \qquad (12)$$

If $CO_3^{--}$ is less than 0.5 mol/l., the cell voltage increases remarkably and the current efficiency is also markedly lowered. Or, if it is more than 4 mol/l., no special merit is obtained, but the material is uneconomically increased.

When $Cl^-$ is less than 0.09 mol/l., the formation mechanism of mercuric oxide is as shown in Formulae 6, 7. This reaction is of the same mechanism as that of the reaction in the single KOH system.

However, when $Cl^-$ is more than 0.09 mol/l., there occur such reactions as, $$2Hg + 2OH^- + 2Cl^- + K^+ = HgO + Hg + KCl + H_2O + Cl^- + 2e \qquad (13)$$

$$2Hg + 2OH = HgO + Hg + H_2O + 2e \qquad (13')$$

so that mercuric oxide is very easily formed. Thus, this mechanism of formation becomes cyclic and effective.

When more than 7 mol/l. of $Cl^-$ are added, the reaction Formulae 9 and 10 are the rate-determining step, and consequently the operation can not continuously be carried out and becomes uneconomical.

In a case that the two constituent system consisting of KOH and KCl is used, a similar condition to the above is required, except the concentration of $OH^-$ is preferably limited within the range of $O < OH^- < 4$ mol/l.

(e) A case that a three constituent system consisting of

KOH, $K_2CO_3$ and KCl

When the addition of $OH^-$ is considerably larger as compared with two other constituents, the reactions of (6) and (7) take place, while the addition of $OH^-$ is small, the reaction of (13) occurs. In the reaction of (13) the current efficiency is somewhat better than in the reactions of (9) and (10), but the tapping density of the obtained mercuric oxide is a little worse than in (9) and (10).

The preferable concentration of the three constituent system is, $$0.5 \text{ mol/l.} < CO_3^{--} < 4 \text{ mol/l.}$$

$$0.09 \text{ mol/l.} < Cl^{--} < 7 \text{ mol/l.}$$

$$O < OH^- < 4 \text{ mol/l.} \qquad (14)$$

As regards the roles of three kinds of anion, carbonate ion is a supporting electrolyte required to maintain the adequate alkalinity of the system and chloride ion is required to form the intermediate active complex during the anode oxidation. As the intermediate activated complex, calomel ($Hg_2Cl_2$) is unstable and decomposes in the high concentration of alkalinity, and the reactions of (8) to (13) take place in the atmosphere of $10 < pH < 13$. Although hydroxyl ion is required to decompose the formed calomel, the reactions of (6) and (7) occur in the presence of excessive $OH^-$ as compared with $Cl^-$.

On the one hand, in a case that the two constituent system containing no KOH is used, the equivalent amount of $K^+$ used for the formation of calomel reacts with water to dissociate $OH^-$. The relative ratio of the obtained $OH^-$ to $Cl^-$ is so small that this $OH^-$ acts gently on calomel as shown in (9) and (10), and thereby mercuric oxide of excellent properties is obtained.

Thus, the mechanism of anode oxidation of metal mercury-calomel-mercury oxychloride-mercuric oxide can be achieved under the balanced condition of various electrolytic factors such as the concentration of electrolyte, electrolytic temperature, current density, etc.

This reaction step can continuously be carried out to prepare mercuric oxide by supplying metal mercury, water and electric energy. Then, the initial state of the electrolyte is maintained from theoretical point of view, so that it is unnecessary to supply the electrolyte, and $Cl^-$ in the electrolyte is circulated as the medium of the reaction.

Suitable electrolytic conditions are as follows:

Anode current density $D_A$ $$0.4 \text{ A./dm.}^2 < D_A < 12 \text{ A./dm.}^2 \qquad (15)$$

Electrolytic bath temperature T $$10°\text{ C.} < T < 95°\text{ C.} \qquad (16)$$

Cell voltage V $$1V < V < 13V \qquad (17)$$

The following examples are given for the purpose of illustration only, but not limiting any scope of the present invention.

EXAMPLE 1

The electrolytic equipment as shown in FIG. 1 was used. A flat plate consisting of insoluble high-purity metal such as electrolytic iron and electrolytic nickel forming no amalgam with mercury was used as the cathode, metal mercury as the anode, 1 mol/l. of $K_2CO_3$ solution as the electrolytic solution. Under the conditions that the current density was 7 A./dm.² and the electrolytic bath temperature was 50° C., the anode oxidation was carried out successfully to prepare high-purity mercuric oxide for a long time while the average cell voltage kept stable at 6.1 v. and the current efficiency remains more than 85%. The obtained mercuric oxide had tapping density of 3.3 and was brown.

In FIG. 1, 1 is an anode bath, 2 a cathode diaphragm made of canvas for the prevention of reduction of formed mercury oxide and the prevention of emission of stimulative gas generated at the cathode, 3 the cathode plate, 4 the formed mercuric oxide 5 the recovered mercuric oxide, 6 the mixture of mercuric oxide and calomel, 7 an agitator, 8 a mercury feed tank and anode, 9 a water feed tank, 10 a syphon, 11 a recovery tank, 12 a recovery pump, 13 a water surface level controller, 14 an electrolytic solution and 15 an electrolytic bath.

EXAMPLE 2

A high-purity electrolytic iron plate was used as the cathode, metal mercury as the anode, a platinum electrode as the anode joint electrode, 4 mol/l. of KOH solution as the electrolytic solution. By keeping the bath temperature at 50° C. and the current density at 2.5 A./dm.², the electrolysis was carried out to obtain mercuric oxide of orange color under 3.8 v. of the average cell voltage and more than 80% of the average current efficiency.

When 4 mol/l. of NaOH solution were used, mercuric oxide of red-orange color (intermediate color) was stably obtained at more than 75% of the average current efficiency.

When a caustic alkali constituent system is employed, preferable conditions are that its concentration is 0.5–8 mol/l., the electrolytic both temperature 30°–80° C., and the current density 0.5–12 A./dm.².

EXAMPLE 3

An alkaline solution of two constituent system consisting of 1.0 mol/l. of $K_2CO_3$ and 0.5 mol/l. of KCl was used as the electrolytic solution, the electrolysis was carried out at 5 A./dm.$^2$ of the current density and 50° C. of the bath temperature and thereby more than 90% of the current efficiency and 5.3 v. of the cell voltage were obtained to successfully prepare high-quality and high-purity mercuric oxide which is dark brown and has tapping density gravity of 5.6.

EXAMPLE 4

In a system which comprised a two constituent solution of potassium group consisting of 0.9 mol/l. of $K_2CO_3$ and 0.3 mol/l. of KCl, by keeping the current density at 5 A./dm.$^2$ and the electrolytic bath temperature at 50° C., the electrolysis was carried out to obtain 4.7 v. of stable average cell voltage and more and more than 80% of the current efficiency for a long time of electrolysis.

Preferable electrolytic conditions are that, as for the concentration of the electrolyte, $K_2CO_3$ is 0.1–2.0 mol/l. and KCl is 0.1–1.2 mol/l., the current density is 0.5–12 A./dm.$^2$, and the electrolytic temperature is 30° C.–95° C.

EXAMPLE 5

When a three constituent alkaline electrolyte consisting of 1.0 mol./l. of $K_2CO_3$, 0.5 mol/l. of KCl and 0.3 mol/l. of KOH was used, the electrolysis was carried out at 5 A./dm.$^2$ of the current density and 50° C. of the bath temperature, reddish brown mercuric oxide was prepared at 4 v. of the cell voltage and more than 90% of the electric efficiency and has tapping density of 5.1.

Preferable concentrations of the electrolyte were 0.1–2.0 mol/l. for $K_2CO_3$, 0–1.2 mol/l. for KCl and 0–2.0 mol/l. for KOH. The preferable current density is 0.5–12 A./dm.$^2$ and the preferable electrolytic temperature is 30°–90° C.

EXAMPLE 6

The electrolyte of a three constituent system consisting of 0.8 mol/l. of $Na_2CO_3$, 0.1 mol/l. of NaCl and 0.1 mol/l. of NaOH was used, the electrolysis was carried out at 5 A./dm.$^2$ of the current density and 50° C. of the electrolytic bath temperature, and thereby 100% of the current efficiency were obtained for a long time at 4.9 v. of stable average cell voltage.

Preferable electrolytic conditions are that the concentrations of electrolyte are 0.1–2.0 mol/l. for $Na_2CO_3$, 0–1.0 mol/l. for NaCl and 0–1.0 mol/l. for NaOH, the current density is 0.5–1.2 A./dm.$^2$, and the electrolytic temperature is 30°–80° C.

Figure 2:
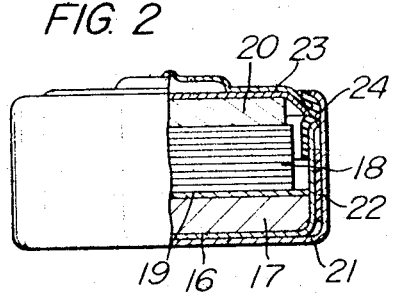

An anode mixed cake was made of mercuric oxide obtained in Example 3, a mercury cell was constructed as shown in FIG. 2, and the comparison of the said cell with those of the conventional wet and dry processes is given in the table.

In FIG. 2, 16 is an inner case, 17 an anode mixed cake, 18 an electrolyte immersed layer containing postassium chloride, 19 a separator, 20 a zinc cathode, 21 an outer case, 22 a paper cylinder for absorbing the electrolytic solution, 23 double sealing plates and 24 an insulator packing.

| Visible color | Wet process, yellow | Dry process, red | Electrolytic process, dark brown |
|---|---|---|---|
| Visible reflection spectrum: | | | |
| Stand-up wave length, mu | 460 | 490 | 510 |
| Percent reflection rate at 590 mu | 90 | 75 | 28 |
| Tapping density (apparent density) (T.D.), 30 g./cc | 2.10 | 3.3 | 5.6 |
| Capacity of mixed agent: | | | |
| Intensity of diffracted ray: | | | |
| (011) | 95 | 50 | 34 |
| (210) | 35 | 33 | 31 |
| (020) | 44 | 58 | 29 |
| Specific resistance: | | | |
| 70 kg./cm.$^2$ | 18.3 | 6.13 | 4.59 |
| 250 kg./cm.$^2$ | 6.51 | 2.13 | 1.43 |
| Height of mixed cake, mm | 1.82 | 1.69 | 1.61 |
| Molding rate of mixed cake, percent | 61 | 95 | 100 |
| Capacity of mercury cell: | | | |
| Average short-circuited current A | 0.38 | 0.11 | 0.68 |
| Average open-circuited voltage V | 1.34 | 1.34 | 1.34 |
| Discharge capacity | 0.274 | 0.320 | 0.351 |

As described above, according to the present invention, it is possible to prepare low-price and high-quality mercuric oxide in very economical manufacturing steps, and the obtained mercuric oxide is excellent as the mixed cake of a cell from the industrial point of view.

What we claim is:

1. A process for preparing mercuric oxide by conducting electro-oxidation in a system which comprises an insoluble metal cathode, a metal mercury anode, and an aqueous electrolyte having a pH greater than 7 and containing 0.5–4 mols/l. of carbonate ion and 0.09–7 mols/l. of chloride ion.

2. A mercury cell comprising mercury oxide obtained according to the process of claim 1.

3. A process as defined in claim 1 wherein said electrolyte contains hydroxyl ion in an amount up to 4 mols/l. in the form of an alkali metal hydroxide.

4. A mercury cell comprising mercury oxide obtained according to the process of claim 3.

References Cited
UNITED STATES PATENTS

| | | | |
|---|---|---|---|
| 1,171,279 | 2/1916 | Tuttle | 324—94 |
| 2,416,978 | 3/1947 | Burgess | 324—94 XR |
| 3,149,917 | 9/1964 | Cadmus | 23—183 |
| 3,255,413 | 7/1966 | Marwoll et al. | 324—94 |
| 3,350,638 | 10/1967 | Kohr | 324—94 |

JOHN H. MACK, Primary Examiner

D. R. JORDAN, Assistant Examiner

U.S. Cl. X.R.

204—219